United States Patent [19]
Guadagni et al.

[11] 3,772,039
[45] Nov. 13, 1973

[54] IMPARTING A POTATO FLAVOR BY ADDING THE HYDROCHLORIC ACID SALT OF 2-METHOXY-3-ETHYLPYRAZINE

[75] Inventors: Dante G. Guadagni, Moraga; Ron G. Buttery, Richmond; Richard M. Seifert, El Cerrito, all of Calif.

[73] Assignee: The United States of America as represented by the Secretary of Agriculture, Washington, D.C.

[22] Filed: May 5, 1971

[21] Appl. No.: 140,614

[52] U.S. Cl. ............ 99/100 P, 99/140, 260/250 R, 260/567.6
[51] Int. Cl. ........................... A23l 1/00, A23l 1/22
[58] Field of Search ................... 99/100, 103, 104, 99/140; 260/250 R, 567.6

[56] References Cited
UNITED STATES PATENTS

| | | | |
|---|---|---|---|
| 3,328,402 | 6/1967 | Winter | 260/250 R |
| 3,579,353 | 5/1971 | Nakel | 99/140 R |
| 3,594,187 | 7/1971 | Liepa | 99/100 P |
| 3,619,211 | 11/1971 | Chang | 99/140 R |
| 3,647,792 | 3/1972 | Evers | 99/250 R |

OTHER PUBLICATIONS

J. Agr. Food Chem. Vol. 18, No. 2. Mar.–April 1970 pp. 246–249.

*Primary Examiner*—Norman Yudkoff
*Assistant Examiner*—Martin G. Mullen
*Attorney*—R. Hoffman, W. Bier and W. Takacs

[57] ABSTRACT

The addition of minor proportions of the hydrochloric acid salt of 2-methoxy-3-ethylpyrazine to potato and other food products is a useful method for increasing or imparting a potato flavor to said products.

1 Claim, No Drawings

IMPARTING A POTATO FLAVOR BY ADDING THE HYDROCHLORIC ACID SALT OF 2-METHOXY-3-ETHYLPYRAZINE

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of a new method for enhancing potato flavor in potato products and imparting a potato flavor to other food products by the addition of 2-methoxy-3-ethylpyrazine. Further objects of the invention will be evident from the following description wherein parts and percentages are by weight unless otherwise specified.

The development of off-flavor in potato products is a major concern of potato processors. The reduction in quality which results from this off-flavor development has prompted studies, and procedures have been devised to control off-flavor development. These procedures have generally taken advantage of hermetic packaging, inert atmosphere, and the addition of antioxidants to improve stability or commercial shelf-life of the products. However, much remains to be learned about flavor improvement, especially in dehydrated mashed potatoes. To this end the invention described herein offers a method for improving potato flavor by the incorporation of 2-methoxy-3-ethylpyrazine (hereinafter referred to as MEP) into the food product. MEP has the following structure:

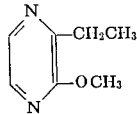

MEP exhibits an intense potato odor and can be used in minor proportions for flavoring potato products such as dehydrated mashed potatoes including potato "Buds," flakes, and granules, potato salad, dehydrated scalloped potatoes, potato soup, and the like; and also for imparting a potato flavor to other food products such as breads, vegetable soups, stews, gravies and sauces, hashes, meat products, and the like.

In using MEP as a flavoring agent, it is incorporated in the food in the same way as one would incorporate any other flavoring or seasoning agent. Because of its intense flavoring value, MEP is ordinarily employed in a very minor proportion, for example, in a concentration of about 0.1 to 0.3 parts per million. Incorporation of 0.4 to 1.0 parts per million of MEP often produces an undesirably strong flavor. It is obvious, however, that there is nothing critical about the concentration which is used; it is simply a matter of attaining a desired flavor level appropriate to the food in question.

MEP may be added directly to the food to be flavored, or it may be first incorporated with a diluent to increase its bulk so that small amounts of the compound may be accurately metered into the food. As the diluent, one may use liquid or solid carriers such as water, ethyl alcohol, glycerol, edible fats or oils, starch, sorbitol, salt, sugar, gelatin, flour, citric acid, powdered skim milk, corn syrup solids, or other non-toxic substances compatible with the material to be flavored.

It is, of course, within the compass of the invention to use MEP in combination with other flavoring agents. For example, one may mix a carrier with MEP and with a known flavoring agent such as monosodium glutamate, onion powder, garlic powder, black pepper, paprika, or dried herbs such as parsley, oregano, celery, sage, and the like.

MEP dissolves readily in water, and a flavoring composition in liquid form may be prepared, for example, by dissolving about 0.1 to 0.3 parts of MEP in 1,000 parts of sterile distilled water.

Although MEP has a potato aroma and flavor, its presence in either raw or cooked potatoes has never been demonstrated. However, when its flavor-enhancing properties are compared with those of certain compounds isolated from raw or cooked potatoes, namely, phenylacetaldehyde, oct-1-en-3-ol, and methional, MEP is the only compound which substantially improves potato flavor. Addition of the other materials results in either a slight improvement of or a detraction from the potato flavor. Thus, MEP provides an advantage over naturally-occurring potato materials. In addition, compounds very similar structurally to MEP, such as 2-methoxy-3-methylpyrazine and 2-methoxy-3-isopropylpyrazine, were found to be ineffective in improving potato flavor.

Another advantage of the invention is that it maintains an enhanced potato flavor in food products even after periods of storage. Indeed, potato salad with 0.2 parts per million of MEP was stored at 3° C. for 1 week and maintained a high level of potato flavor. This is an extremely important attribute of an additive since commercial potato and other food products are subject to storage at the warehouse, in transit to and at the market, and in the home.

Another phase of the invention concerns the salts of MEP. Since MEP is an organic base, it is capable of forming salts. Indeed, these salts constitute a valuable form of MEP in that they exhibit low volatility and hence can be kept for long periods of time without loss of MEP. As in the case of other organic bases, the salts of MEP are readily prepared by contacting MEP with an acid. Usually hydrochloric acid is employed, but this is by no means critical and one can use other acids such as sulphuric, phosphoric, acetic, citric, fumaric, tartaric, etc.

When the salt is to be used, the MEP is readily released therefrom by contact with a basic substance such as sodium bicarbonate, sodium carbonate, calcium hydroxide, sodium hydroxide, potassium hydroxide, potassium carbonate, or the like. Alternatively, the salts of MEP can be used as such to flavor foods. They are effective in such flavoring applications because MEP is a very weak base, hence is readily freed from its salts on contact with materials having basic or buffering properties such as are normally present in many foods. In utilizing the salts of MEP directly as flavoring agents, they are incorporated into the food to be flavored in the same manner as explained hereinabove in connection with MEP in the free base form. In sum, the salts, as such or in a carrier, are incorporated in the food in the amount which yields the desired flavor. Moreover, flavoring compositions can be formed with the salts just as hereinabove explained with MEP itself.

The invention is further demonstrated by the following illustrative examples.

EXAMPLE 1. SYNTHESIS OF 2-METHOXY-3-ETHYLPYRAZINE

1. Synthesis of 2-aminobutyramide hydrobromide. Ammonium hydroxide (30% $NH_3$, 250 ml.) was cooled to −30° C. and saturated with ammonia for 0.5 hour. Ethyl 2-bromobutyrate (50 g.) was then added. Additional ammonia was bubbled for 6 hours while maintaining the temperature of the mixture below −5° C. Afterwards, the mixture was stored for 5 days at −10° C. and for 7 days at −2° C. Excess ammonia and water were removed using a 40° C. water-bath and a water-pump vacuum. The crystalline mass that remained was recrystallized from 95% ethanol to give 32.4 g. (69% yield) of 2-aminobutyramide hydrobromide.

2. Synthesis of 2-hydroxy-3-ethylpyrazine. 2-Aminobutyramide hydrobromide (75 g.) was dissolved in methanol (700 ml.) and the mixture cooled to −40° C. Glyoxal (74 g. of commercial 40% aqueous solution containing 29 g. of glyoxal) was added dropwise over 0.5 hour at −40° C. Sodium hydroxide (44 g.) in water (80 ml.) was then added dropwise to the stirred mixture at −40° C. The mixture was kept at −30° C. for 0.5 hour, allowed to warm to room temperature (25° C.) over a period of 2.5 hours, cooled to −5° C., and neutralized with hydrochloric acid. The separated salts were filtered and the filtrate was evaporated to dryness, using a rotary evaporator. The remaining material was dissolved in methanol and the solution was filtered. The dark filtrate was concentrated to near dryness and extracted five times with 100-ml portions of chloroform. The chloroform solution was treated with activated charcoal, filtered, and the solvent removed to give crude crystalline 2-hydroxy-3-ethylpyrazine (45 g., 89% yield). Recrystallization was accomplished as follows: once from methanol-pentane, m.p. 101°–103° C., and twice from benzene-pentane, m.p. 105° C. The infrared and mass spectra were consistent with the desired material.

3. Synthesis of 2-methoxy-3-ethylpyrazine. 2-Hydroxy-2-ethylpyrazine (9.95 g.) was added to $POCl_3$ (50 g.) and refluxed for 3 hours. The mixture was cooled to room temperature, poured onto chopped ice (400 g.) and ether (200 ml.), and neutralized with ammonium hydroxide (30% $NH_3$, 50 ml.), keeping the mixture below 10° C. The ether layer was separated and the aqueous layer was made strongly alkaline with sodium hydroxide and extracted four times with 100-ml portions of ether. The ether extracts were combined, dried over sodium sulfate, and evaporated on a rotary evaporator. The residue was distilled and the fraction, b.p. 92°–93° C. (2 mm Hg), was collected to give 2-chloro-3-ethylpyrazine (8.0 g., 68% yield).

The 2-chloro-3ethylpyrazine (7.5 g.) was added to a solution of potassium hydroxide (9.0 g.) in methanol (54 ml.) and the mixture was refluxed for 2 hours. After cooling, the precipitated sodium chloride was removed by filtration and the methanol was evaporated by means of a rotary evaporator. Water (20 ml.) was added and the mixture was extracted with four 100-ml portions of ether. The ether extracts were combined, dried over sodium sulfate, filtered, and evaporated. The residue was distilled to give 2-methoxy-3-ethylpyrazine (5.4 g., 73% yield, 49% overall yield from 2-hydroxy-3-ethylpyrazine, b.p. 95°–98° C. at 20 mm Hg). The product was better than 99% pure based on gas-liquid chromatographic analysis. The molecular weight was 138 by mass spectrometry. The infrared absorption spectrum was as follows: strong bands at 6.5, 6.85, 6.9, 7.2, 7.5, 8.4, 8.6, 8.7, 9.9 microns.

Example 2 — Difference Thresholds of Some Pure Compounds in Dehydrated Mashed Potato Flakes The compounds were obtained from reliable commercial sources or were synthesized by well-established procedures. All compounds were purified by preparative gas-liquid chromatography before use in potato products.

The principal testing was done on dehydrated mashed potato flakes. Commercial consumer-size samples were used. In addition, potato "Buds" and granules were also studied. Each product was prepared according to the manufacturer's instructions except for addition of varying amounts of the compounds to be tested. Stock water solutions of compounds were prepared and the proper amounts of these solutions were added to the liquid portion of the mixture at the same time that the dry potatoes were mixed in. Samples with and without additive were adjusted to the same water content to avoid texture differences.

In general, a sensory panel of 20 trained tasters was used to evaluate the flavor effect of the various additives.

The difference thresholds can be defined as follows: The value of the difference threshold in parts per million represents the amount of a compound which must be added to the potato material to establish a difference in taste between the control and the treated material. The results are summarized in Table 1.

TABLE 2 – Difference Thresholds of Some Pure Compounds in Dehydrated Mashed Potato Flakes

| Compound | Difference threshold (ppm) |
|---|---|
| MEP | 0.040 |
| Phenylacetaldehyde | 0.35 |
| oct-1-en-3-ol | 1.5 |
| Methional | 2.5 |
| 2-Methoxy-3-methylpyrazine | 0.050 |
| 2-Methoxy-3-isopropylpyrazine | 0.050 |

Example 3 — Effect of Additives on Flavor of Dehydrated Mashed Potato Flakes

The judges were presented with a control and a sample of treated material and were asked to select the sample with the most potato flavor. The samples were prepared as described in Example 2. The concentrations of the additives were such that the difference threshold lay somewhere between the two values shown. Other concentrations of additives as well as other forms of dehydrated mashed potatoes were evaluated, but the results were similar to those summarized in Table 2.

TABLE 2 — Effect of Additives on Flavor of Dehydrated Mashed Potato Flakes

| Compound | Concentration (ppm) | N* | Preference, no. of judges Treated material | Control |
|---|---|---|---|---|
| MEP | 0.050 | 40 | 28 | 12 |
|  | 0.100 | 20 | 15 | 5 |
| Phenylacetaldehyde | 0.256 | 20 | 11 | 9 |
|  | 0.512 | 20 | 8 | 12 |
| oct-1-en-3-ol | 1.0 | 20 | 4 | 16 |
|  | 2.0 | 13 | 3 | 10 |
| Methional | 3.0 | 20 | 8 | 12 |
|  | 10.0 | 20 | 6 | 14 |
| 2-Methoxy-3-methylpyrazine | 0.040 | 20 | 10 | 10 |
|  | 0.080 | 20 | 7 | 13 |
| 2-Methoxy-3- |  |  |  |  |

Example 4 — Effect of MEP on Flavor of Some Potato-containing Products

The samples were prepared as described in Example 2. The judges were presented with a sample of treated material and a control and were asked to select the one with the most potato flavor. The results are tabulated below.

TABLE 3 — Effect of MEP on Flavor of Some Potato-containing Products

| Product | Concentration of MEP (ppm) | N* | Preference, no. of judges Treated Material | Control |
|---|---|---|---|---|
| Potato salad No. 1 | 0.100 | 20 | 16 | 4 |
| Potato salad No. 2 | 0.100 | 20 | 16 | 4 |
| Cream of potato soup | 0.025 | 20 | 16 | 4 |
| Cream of potato soup | 0.050 | 20 | 17 | 3 |
| Cream of potato soup | 0.100 | 20 | 16 | 4 |
| Vegetable beef soup | 0.015 | 20 | 11 | 9 |
| Vegetable beef soup | 0.025 | 20 | 15 | 5 |
| Vegetable beef soup | 0.050 | 20 | 15 | 5 |
| Vegetable beef soup | 0.100 | 20 | 15 | 5 |
| Scalloped potatoes | 0.100 | 20 | 18 | 2 |
| Mashed potato "Buds" | 0.050 | 52 | 39 | 19 |
| Mashed potato "Buds" | 0.200 | 40 | 26 | 14 |
| Mashed potato granules | 0.100 | 20 | 12 | 8 |
| Mashed potato granules | 0.150 | 40 | 27 | 13 |

*N=Total number of judges

Having thus described our invention, we claim:

1. A method for enhancing the potato flavor of potatoes and potato products, which comprises -
   adding thereto the hydrochloric acid salt of b 2-methoxy-3-ethylpyrazine,
   said salt being added in an amount of about 0.1 to 0.3 parts per million.

* * * * *